United States Patent
Wahrisch et al.

(10) Patent No.: US 9,784,382 B2
(45) Date of Patent: Oct. 10, 2017

(54) GAS SHUT-OFF VALVE

(71) Applicant: Johnson Electric S.A., Murten (CH)

(72) Inventors: Sten Wahrisch, Dresden (DE); Joerg Gassmann, Dresden (DE); Sebastian Fraulob, Dresden (DE)

(73) Assignee: Johnson Electric S.A., Murten (CH)

( * ) Notice: Subject to any disclaimer, the term of this patent is extended or adjusted under 35 U.S.C. 154(b) by 135 days.

(21) Appl. No.: 14/474,951

(22) Filed: Sep. 2, 2014

(65) Prior Publication Data
US 2015/0060711 A1 Mar. 5, 2015

(30) Foreign Application Priority Data
Sep. 2, 2013 (DE) .......................... 10 2013 109 570

(51) Int. Cl.
*F16K 1/42* (2006.01)
*F16K 31/04* (2006.01)
*F16K 31/50* (2006.01)
*F16K 31/524* (2006.01)
*G01F 15/00* (2006.01)

(52) U.S. Cl.
CPC .............. *F16K 31/045* (2013.01); *F16K 1/42* (2013.01); *F16K 31/048* (2013.01); *F16K 31/508* (2013.01); *F16K 31/52408* (2013.01); *G01F 15/005* (2013.01)

(58) Field of Classification Search
CPC .... F16K 31/048; F16K 31/508; F16K 31/045; F16K 31/52408; F16K 1/42; G01F 15/005
See application file for complete search history.

(56) References Cited

U.S. PATENT DOCUMENTS

| 3,170,339 | A | * | 2/1965 | Plume | F16K 31/05 251/129.12 |
| 3,423,661 | A | * | 1/1969 | Gustafson | H02K 7/1023 318/275 |
| 3,524,526 | A | * | 8/1970 | Denkowski | F16H 25/2021 192/141 |
| 4,114,078 | A | * | 9/1978 | Malinski | F16K 31/048 307/124 |
| 4,116,112 | A | * | 9/1978 | Hampejs | F15B 9/12 91/380 |

(Continued)

FOREIGN PATENT DOCUMENTS

| CN | 2534564 Y | 2/2003 |
| CN | 201397166 | 2/2010 |

(Continued)

*Primary Examiner* — Eric Keasel
(74) *Attorney, Agent, or Firm* — Muncy, Geissler, Olds & Lowe, P.C.

(57) ABSTRACT

A gas shut-off valve for installation in gas meters, has a valve disk that can be moved in the longitudinal direction with respect to its valve seat. The movement is realized by a linear unit held in the longitudinal direction in a valve casing, which is actuated by an electric motor via reduction gearing. The valve seat has a lip seal. The electric motor is a small DC motor. The reduction gearing and the linear unit, are installed in a panel of the valve casing. The linear unit is a rack-and-pinion gearing or a sliding-screw gearing, having an adjusting-nut element and an adjusting rod.

8 Claims, 5 Drawing Sheets

(56) References Cited

U.S. PATENT DOCUMENTS

| | | | | |
|---|---|---|---|---|
| 5,295,907 | A | * | 3/1994 | Akkerman ............ F16D 27/105 |
| | | | | 251/129.11 |
| 6,003,837 | A | * | 12/1999 | Raymond, Jr. ....... F16K 31/055 |
| | | | | 251/129.12 |
| 6,129,105 | A | | 10/2000 | Hec et al. |
| 7,607,637 | B2 | * | 10/2009 | Furrer .................. F16H 57/033 |
| | | | | 251/129.11 |
| 2007/0256747 | A1 | * | 11/2007 | Morris ................. F16K 31/047 |
| | | | | 137/625.65 |

FOREIGN PATENT DOCUMENTS

| | | |
|---|---|---|
| CN | 102818062 | 12/2012 |
| DE | 1844857 U | 1/1962 |
| DE | 69601428 | 8/1999 |
| DE | 10248616 A1 | 5/2004 |
| DE | 102011110379 A1 | 2/2013 |
| EP | 0836701 | 4/1988 |
| EP | 0836702 | 4/1998 |
| EP | 2239174 A2 | 10/2010 |
| GB | 2 077 885 A | 12/1981 |
| JP | H05118457 A | 5/1993 |
| JP | H11173430 A | 6/1999 |
| JP | 2000038935 A | 2/2000 |
| WO | WO97/02471 | 1/1997 |
| WO | WO2011/134849 A1 | 11/2011 |

\* cited by examiner

GAS SHUT-OFF VALVE

CROSS REFERENCE TO RELATED APPLICATIONS

This non-provisional patent application claims priority under 35 U.S.C. §119(a) from Patent Application No. 102013109570.4 filed in Germany on Sep. 2, 2013, the entire contents of which are hereby incorporated by reference.

FIELD OF THE INVENTION

This invention relates to a gas shut-off valve for installation in a gas meter.

BACKGROUND OF THE INVENTION

Gas meters customarily contain a counting mechanism in addition to two alternately filling, elastic measuring chambers with their control systems and are more and more frequently equipped with components for a remote query of the meter reading and for a remote shut-off of the gas flow. A remote shut-off is necessary for prepaid systems, for example, or the deactivation of the gas meter by the gas utility company from a distance, independently of the consumer. A shut-off valve that can be operated by an actuator is used for this. Housing the shut-off valve and its power supply unit in the interior of the gas meter is desirable in the interests of a design that is as compact as possible, a reduction of operating noise and an increase in manipulation security. This leads to the requirement for a small dimensioned the shut-off valve having a high level of operational reliability, a tight gas seal of the electrical actuator and for maintenance-free operation for as long as possible, also including long-term, battery-power operation. The latter especially requires energy consumption that is as low as possible when the shut-off valve is adjusted. In the process, sparks that could possibly ignite gas that has penetrated into the interior of the shut-off valve are not permitted.

Actuators based on electric motors, which are less sensitive to willful jolts, vibrations and other types of manipulation, have prevailed in the market due to improved manipulation security compared with actuators based on solenoid drive units.

PRIOR ART

A gas shut-off valve is known from EP 0836 701 that is directly arranged on the gas supply connector in a gas meter and is considered to be the closest prior art to this invention. That gas shut-off valve has a valve element that can be moved in the longitudinal direction with respect to the valve seat, wherein the valve element is connected to a valve stem that is aligned in accordance with the longitudinal direction, wherein at least a part of the valve stem has an external thread and interacts with a part that surrounds this part of the valve stem and forms a nut, wherein the valve stem consequently moves in a screw-type fashion. The valve element itself is attached to the valve stem, which is rotated by a stepper motor and which transmits the rotation via a mechanical drive unit. The valve stem supports a gear ring that is seated on the shaft between the valve element and the part constituting a nut, and interacts with a motor pinion rotated by a stepper motor around a second axis that is parallel to the valve stem.

Valve-disk designs according to EP 0 836 701 B1 and EP 0 863 702 B1 are, moreover, decidedly demanding in terms of construction and require precise control for reasons relating to safety and functionality to achieve a flawless valve seating of the sealing element.

Technical Problem to be Solved

The known gas shut-off valves are in need of improvement with regard to their dimensions, security, reliability and service life. The valves that are adjusted by means of a stepper motor require complex and therefore expensive control electronics. Defined positioning distances can in fact be realized with stepper motors with a step specification, and they rule out a creation of sparks based on their design, but they are relatively large and more expensive than DC motors, for instance, that are comparable in performance.

When miniature DC motors with a predefined runtime control are used, which are actually economical, the problem arises that the DC motors change their operating point in dependence upon the load, and the actual opening/closing time of the valve consequently changes during operation, caused by gas pressure fluctuations for instance. To ensure complete opening/closing, the DC motors have to therefore be supplied with electrical power for a longer period of time than is actually necessary; the valve disk moves in a hard way to the limit stop of the valve seat in the process. The energy consumption is high during the time at the limit stop, which puts an unnecessarily load on the battery with regard to the supply of power, and the service life of the motor is reduced because of the maximum flow of current through the brushes.

A further drawback of known gas shut-off valves is that they have nearly flat valve disks. In the open state, the gas consequently flows vertically against the valve disk and is laterally diverted there. Unnecessary turbulence arises because of that, especially if the valve casing is supposed to be as small as possible and the flow resistance of the valve is not optimal. In addition, valve disks with flat seals have to be pressed against the valve seat with more force to achieve a tight gas seal and to maintain it for a long period of time under changing environmental conditions, such as temperature and gas pressure. Motors with a correspondingly greater output are therefore required to generate the high sealing force.

The complex designs that operate with a ratchet action and cam drives have to overcome substantial torques to overcome the two dead points in the end position of the valve rod. The motors have to therefore have correspondingly large dimensions and draw an undesirably high amount of current, which is at the expense of the battery charge.

SUMMARY OF THE INVENTION

Hence there is a desire for a gas shut-off valve with electrical motor operation that does not have all of the above-mentioned drawbacks and that can be easily integrated into gas meters with a customary design.

A gas shut-off valve for installation in gas meters as per the present invention has a valve disk that can be moved in the longitudinal direction with respect to its valve seat and that is seated on an adjusting rod held in the longitudinal direction in the valve casing. This valve disk is coupled via the adjusting rod to a linear unit that is in turn actuated by an electric motor via reduction gearing. A lip seal 6 is arranged in the valve seat. A small DC motor 11 is arranged in a separate housing chamber 10 as the drive unit for the new type of gas shut-off valve; it drives the linear unit via the reduction gearing 13, 14, 15, 15', 16 that is arranged laterally next to the linear unit. The choice of rack-and-pinion gearing or sliding-screw gearing, comprising an adjusting-nut element 17, 17' and an adjusting rod 18, 18' integrated into a panel 3 of the valve casing 1, 3, 4, 10, can be arranged and designed to be the linear unit.

Accordingly, in one aspect thereof, the present invention provides a gas shut-off valve for installation in gas meters, comprising a valve disk that can be moved in a longitudinal direction with respect to a valve seat, said valve disk being seated on an adjusting rod held in the longitudinal direction in a valve casing, and a coupled linear unit that is actuated by an electric motor via reduction gearing, wherein, a) the valve seat has a lip seal, b) the electric motor is a small DC motor, c) the reduction gearing is arranged laterally on the side of the linear unit, and d) the linear unit is designed to be a rack-and-pinion gearing or a sliding-screw gearing, comprising an adjusting-nut element and an adjusting rod integrated into a panel of the valve casing.

Preferably, a mechanical device is used to limit the torque of the energized small DC motor in at least the closed position and/or the open position of the valve.

Preferably, the device limiting the torque is arranged in the sliding-screw gearing.

Preferably, the adjusting rod of the sliding-screw gearing disengages from the adjusting-nut element and is then free-running in a predefined closed position or in closed and open positions of the valve.

Alternatively, the device limiting the torque is arranged in the reduction gearing.

Preferably, a radial or axial frictional retainer acts between at least one gear shaft of the reduction gearing and its gear.

Alternatively, the device limiting the torque is arranged in the valve disk.

Alternatively, a carrier held so as to be displaceable in the valve disk is radially mounted against a conical, plastic threaded wedge connected in a torsion-resistant way to the adjusting-nut element.

Preferably, the adjusting-nut element, actuated by the reduction gearing, is rotatably mounted in a lower housing part and the adjusting rod has a torsion lock in the area of the panel in which it is mounted in a longitudinally displaceable way.

Alternatively, the adjusting rod, actuated by the reduction gearing, is rotatably mounted in a lower housing part and the adjusting-nut element has a torsion lock in the area of the panel in which it is mounted in a longitudinally displaceable way.

Alternatively, the adjusting-nut element is mounted in the lower housing part in a torsion-resistant way and the adjusting rod, actuated by the reduction gearing, is mounted in the area of the panel so as to be rotatable and longitudinally displaceable.

Preferably, the valve disk has a curved, streamlined design relative to the gas inlet.

Preferably, the reduction gearing is a multiple-reduction spur gearing.

Preferably, the panel forms a separate housing chamber for the small DC motor and a lateral gas outlet opening.

Advantages of the Invention

The present invention enables the construction of gas shut-off valves that are, to an unusual degree, smaller, more flow-effective and more secure against manipulation, with less required maintenance, greater ease of installation and greater cost-effectiveness, for installation in both gas meters of the size that has been customary up to now and in new types of gas meters that have a substantially smaller design, both for remote shut-off systems and for prepay systems. The use of small DC motors (miniaturized tiny electric motors for the most part) with substantially lower levels of power consumption than before in combination with a mechanical power consumption limitation/torque limitation in at least one end position of a valve disk also makes heavily reduced energy consumption possible, both with regard to actuation and with regard to the switching of the valve; an installed storage battery only has to be regenerated or replaced after several years. The control electronics is reduced to a minimum because the small DC motors merely require fixed turn-on time control. As a further advantage, the explosion-related safety (reduction in possible spark formation in the electrical part of the motor) is improved because of the very small currents that flow. This new type of design makes it possible to completely fill the electrical part with insulation materials or to seal it completely off against the gas-carrying parts in a simple way. Another advantage is that these gas shut-off valves can also be automatically manufactured to a great extent due to their compact design, directly in an automated, single clamping step for the most part; a further cost advantage arises because of that. Both the sealing behavior in the closed state and the flow behavior of the gases that flow in the open state are improved because of the use of special lip seals and the curved, flow-optimized valve disks.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
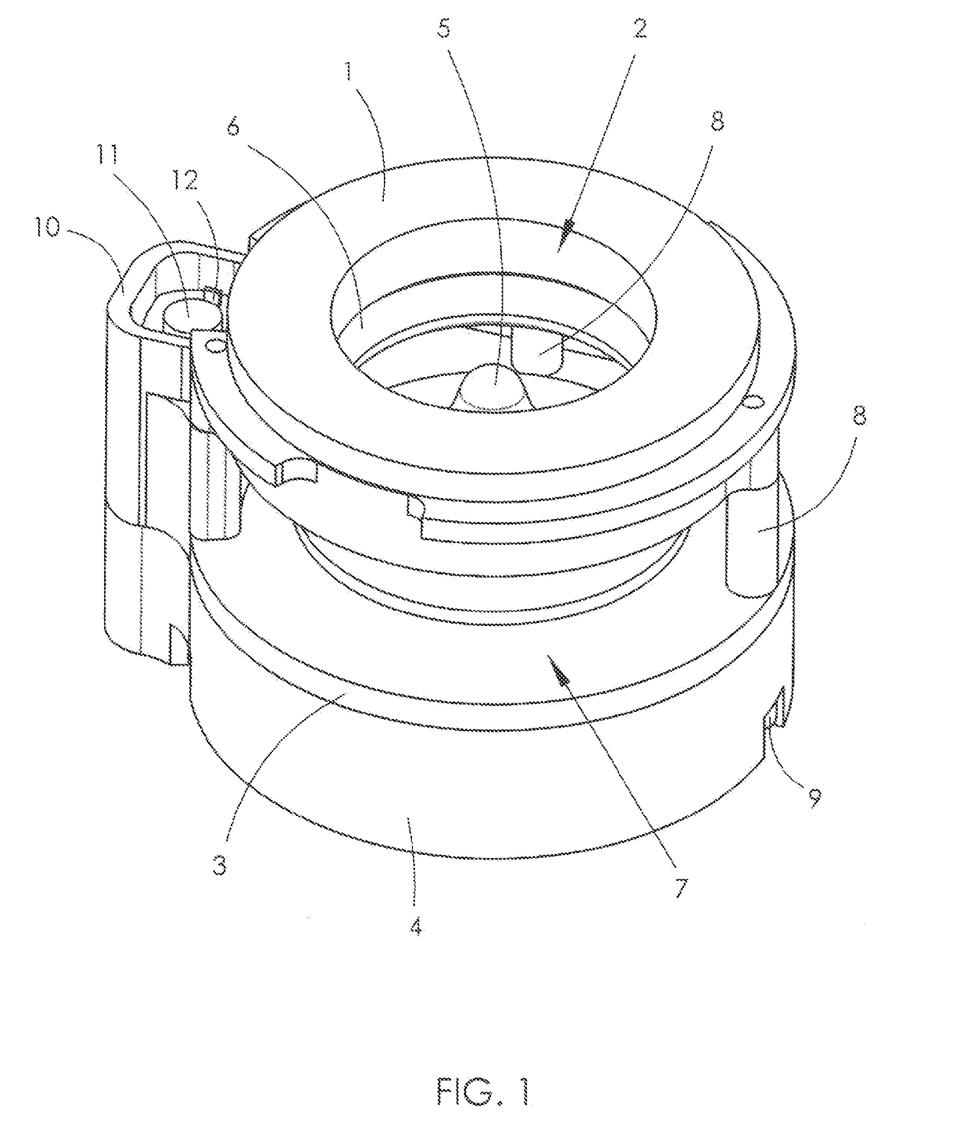
FIG. 1 is an external overall view of a valve according to preferred embodiments of the present invention

FIG. 1 depicts the outside of a gas shut-off valve as per the exemplary embodiments of the present invention and shown in the open position of the valve. The cylindrical, plastic housing of the gas shut-off valve is essentially comprised from the top to the bottom of an upper housing part 1 with a gas inlet 2, a panel 3 and a lower housing part 4. A curved and flow-optimized valve disk 5 seals the gas inlet 2 of the valve in conjunction with a lip seal 6 mounted on the upper housing part 1. The panel 3 is fixed at a predetermined spacing from the upper housing part 1 to define a lateral gas outlet 7. Spacers 8 (preferably formed on the panel 3) determined the size of the spacing. Connection screws 9 for holding the housing together go through the spacers, and there is a small, separate housing chamber 10 vertically and peripherally formed on the panel 3 that accommodates a small DC motor 11. The electrical connections 12 for the small DC motor 11 are routed out of the housing chamber 10 at the top. The lower housing part 4 terminates the housing chamber 10 at the bottom. Because of the separate housing chamber 10, the tiny electric motor can have a fully encapsulated design and can be potted in such a way (not shown in the drawings) that the required explosion-related safety can be reliably ensured over the entire service life of a valve of this type.

Figure 2:
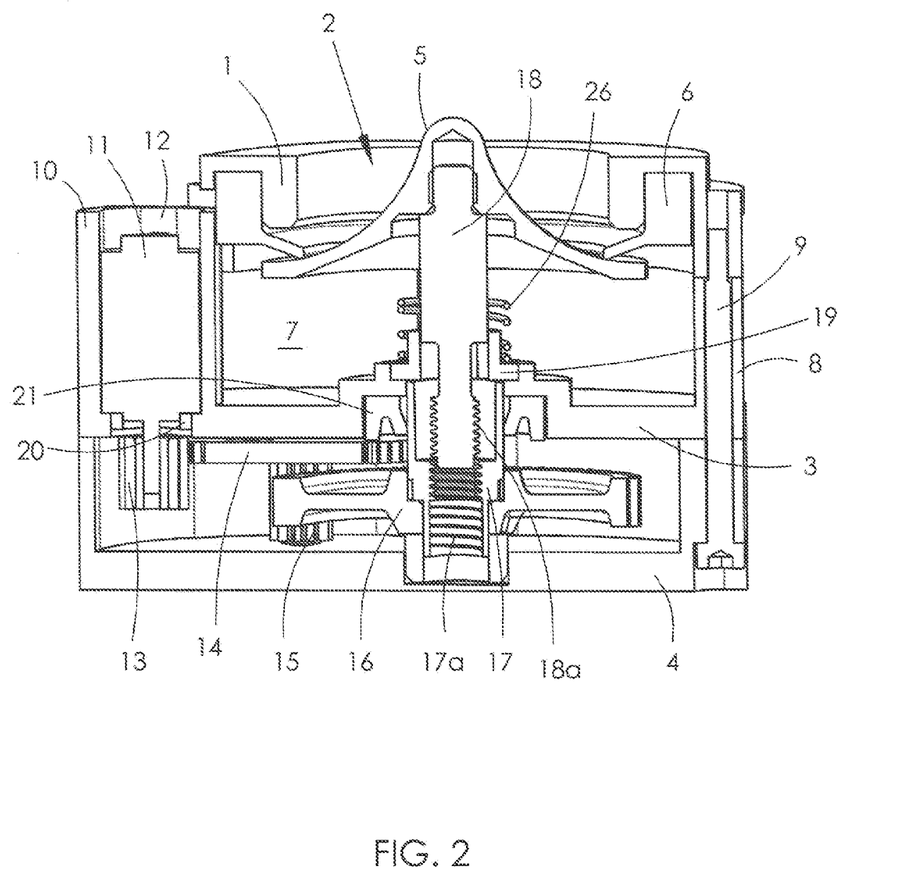
FIG. 2 is a sectional view through the valve in a first design variant in a closed valve position.

FIG. 2 is a sectional view through a gas shut-off valve according to FIG. 1 in a first embodiment and with the valve in the closed position. The housing made up of the upper housing part 1, the panel 3 and the lower housing part 4 can be identified. The housing is joined by means of the connection screws 9 that run through the spacers 8 of the panel 3 and that tightly hold the three housing parts together with one another. The small DC motor 11 with its upper electrical connections 12 is seated in a positive interlocking way in the separate housing chamber 10 formed on the panel 3. The motor shaft of the small DC motor 11 projects out of the separate housing chamber 10, extends into the lower housing part 4 and supports a drive pinion 13 on the free end.

The ring-shaped lip seal 6 is inserted into the upper housing part 1 and surrounds the gas inlet 2. The streamlined, taper-optimized valve disk 5 provides a gas-tight seal for the gas inlet 2 in the position as shown, bearing against the diagonally inward-facing lip seal 6 of the gas outlet 7. The lip of the lip seal 6 is pressed against the valve disk 5 fixed in the closed position because of the gas pressure that is permanently applied, so the seal is always permanently tight in the closed position and gas cannot flow through it.

Reduction gearing made up of spur gear wheels, whose function will now be described in more detail, is mounted in the space between the panel 3 and the lower housing part 4. The drive pinion 13 operates on a large intermediate gear 14 mounted in the lower housing part 4; a further small intermediate gear 15 is seated in a fixed way on the shaft of the large intermediate gear. This small intermediate gear 15 drives, for its part, a large output gear 16, which is seated on an adjusting-nut element 17 in a torsion-resistant way. The output gear 16 and the adjusting-nut element 17 can also constitute a single part, though. The adjusting-nut element 17 is mounted both in the lower housing part 4 and in a through-hole of the panel 3. When rotated around its axis, it actuates an adjusting rod 18 along the lines of sliding-screw gearing (nut-threaded spindle system). Preferably, the adjusting rod 18 has, on its lower end, an external thread 18a corresponding to the internal thread 17a of the adjusting-nut element 17 and is mounted in the internal thread 17a of the adjusting-nut element 17, on the one hand, and in a torsionally rigid way, but capable of movement, through a sleeve 19 fastened to the panel 3, on the other hand. The upper part of the adjusting rod 18 can be flattened, for instance, or adapted in an angular fashion to the internal contour of the sleeve 19 for the purpose of providing resistance to torsion i.e. so that it cannot rotate. The sleeve 19 can be a separate part or can be formed in the panel 3 as one piece. The adjusting rod 18 either moves upwards or downwards depending on the direction of rotation of the adjusting-nut element 17. The valve disk 5 closes or opens in accordance with the valve. The adjusting rod 18 and the valve disk 5 may comprise two separate parts or they may be made of a single-piece, plastic formed part in an injection molding process. The soft coil spring 26 between the sleeve 19 and the valve disk 5 provides for reliable insertion of the adjusting rod 18 into the adjusting-nut element 17 and therefore for reliable operation of the valve disk 5.

The internal gas pressure itself increases the seal tightness of the valve because of the lip seal 6. This permits a minimization of the sealing force that has to be applied by the drive. In combination with the reduction ratio of the motor speed from the drive pinion 13 to the adjusting-nut element 17 and therefore to the adjusting rod 18, this permits the use of an especially small DC motor 11 with a very low level of power consumption.

The small DC motor 11 is sealed on top and on the bottom with a potting compound 20. The panel 3 is likewise sealed against the lower housing part 4 with a sealing element (not shown). In addition, a shaft seal 21 mounted on the panel 3 seals the adjusting-nut element 17 against the space carrying the gas 7.

If the small DC motor 11 is energized with direct current with an open valve position, the reduction gearing described above drives the adjusting rod 18 and therefore the valve disk 5 against the lip seal 6. The closing path is not limited by a fixed limit stop, however, or by the shutoff of the small DC motor 11, but is instead purely displacement-controlled in a mechanical fashion in accordance with experience. The adjusting rod—adjusting-nut element 18/17 determines the end stroke of the adjusting rod 18 along the lines of a shaped detent or an automatic engagement/disengagement coupling in that the external thread 18a of the adjusting rod 18 disengages from the internal thread 17a of the adjusting-nut element 17 after a predefined path that ensures a reliable closed position of the valve. At that moment, the small DC motor 11 rotates the reduction gearing 13, 14, 15, 16 and the adjusting-nut element 17 in idle mode, until the small DC motor 11 shuts off. The duration of the switch-on interval is preset in the process in such a way that the adjusting rod 18 reliably gets to its end position before the small DC motor 11 shuts off, regardless of external influences. Several seconds are planned in as a safety margin. This does not significantly burden either the small DC motor 11 or the current source feeding it.

If the valve opens again, the small DC motor is energized once again, but this time with a reversed current polarity, i.e. the motor rotates in the opposite direction. The adjusting rod 18 goes into the adjusting-nut element 17, preferably supported by the spring effect of the lip seal 6, and is moved, taking the valve disk 5 along with it, in the direction towards the base of the lower housing part 4. The adjusting-nut element 17 screws, with its internal thread 17a, the adjusting rod 18 into the open position of the valve until the end of the external thread 18a on the adjusting rod 18 is reached. At that moment, the small DC motor 11 in turn rotates the reduction gearing in idle mode until the shutoff point. A time-related safety margin for the energizing interval of the small DC motor 11 can also be provided in connection with this. When the valve closes again, the external thread 18a of the adjusting rod 18, supported by the pressure spring 26, spins into the internal thread 17a of the adjusting-nut element 17 once again.

In the example, the small DC motor 11 runs in idle mode unit it shuts off, both after the upper, preset stroke of the adjusting rod 18 is reached and after the lower, preset stroke of the adjusting rod 18 is reached. Part of the scope of application of the invention is a situation in which the small DC motor 11 does in fact run in idle mode until the point in time it shuts off starting with the time period when the exact closing position of the adjusting rod 18 is reached, but makes the most of a slight, permissible end clearance in the opening path of the adjusting rod 18 during the opening process and actuates the adjusting rod 18 up to the shutoff point in time without it hitting the limit stop at the base of the lower housing part 4. The burden is also taken off the small DC motor and the current source in that type of operation.

Figure 3:
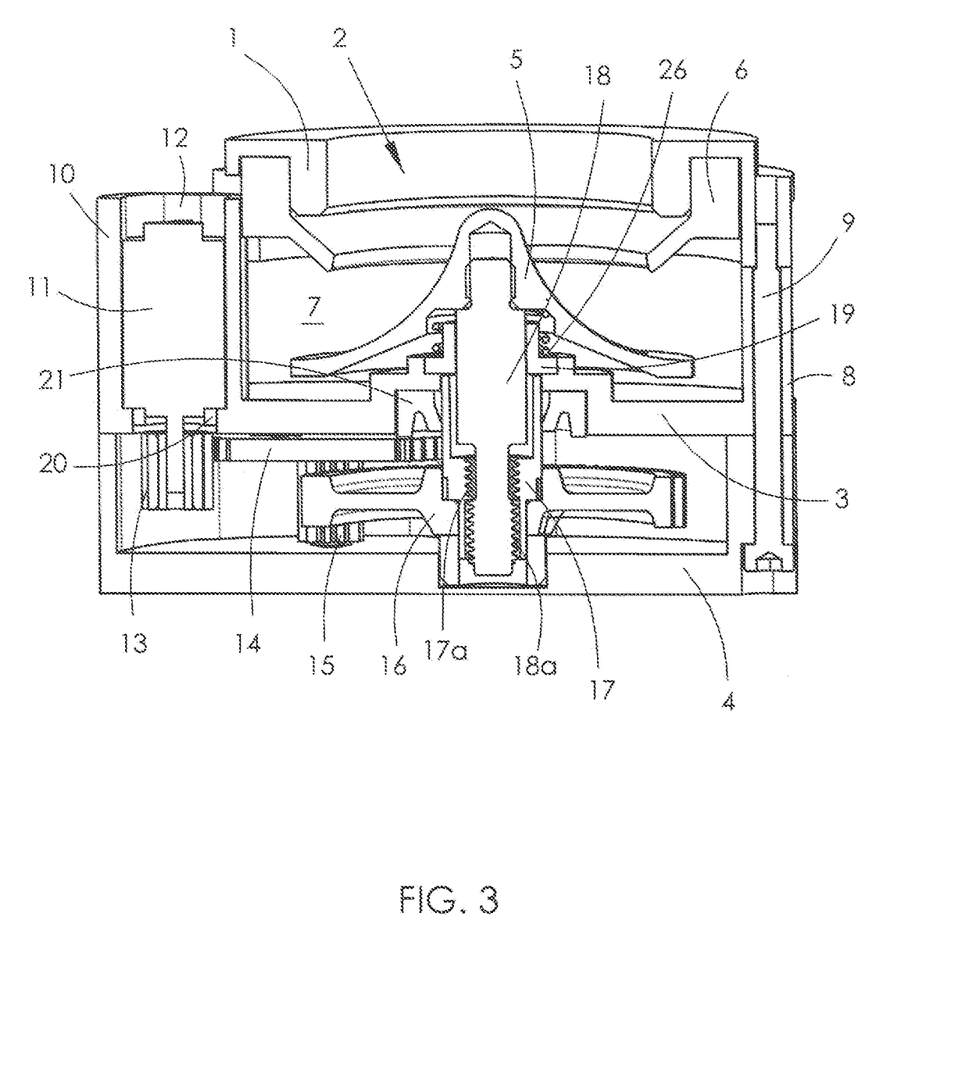
FIG. 3 is a sectional view through the valve in a first design variant in an open valve position.

In FIG. 3, the same embodiment as in FIG. 2 is shown once again to better illustrate an open valve position.

Figure 4:
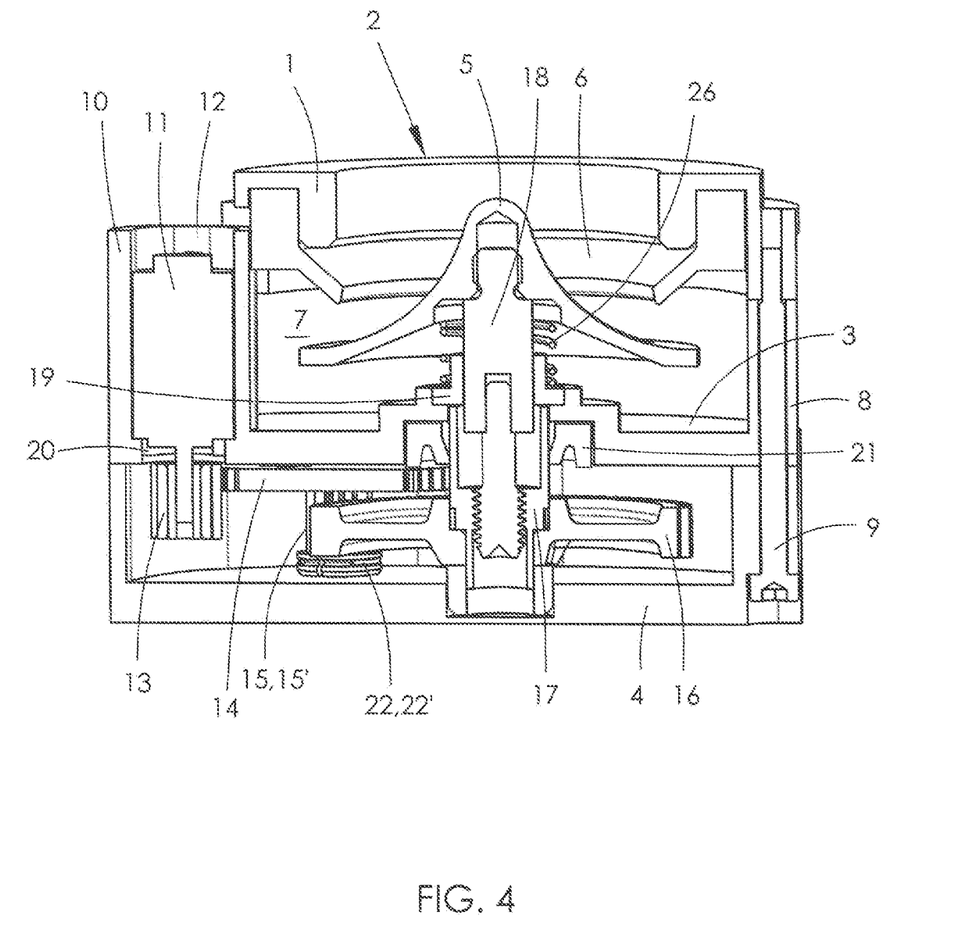
FIG. 4 is a sectional view through the valve in a second design variant.

In a further embodiment according to FIG. 4, the torque limitation of the small DC motor 11 is not dependent upon the positioning distance, but instead upon the actuating force. In the example that is shown, a frictional retainer in the multi-stage reduction gearing limits the actuating force and therefore the maximum torque of the small DC motor 11 up to the shutoff point in time of the small DC motor 11. In an especially simple embodiment, the small gear 15' is slotted for this and is seated with its own spring force or via the force of a frictional retainer spring 22 acting radially on the small gear 15' here on its shaft, which is simultaneously also the shaft of the large intermediate gear 14. Now if the adjusting rod 18 presses the valve disk 5 with sufficient force against the lip seal 6 in the end position, the adjusting-nut element 17 with its output gear 16 and therefore the small slotted gear 15' as well provide a block; the energized small DC motor 11 rotates the pinion 13 and the large intermediate gear 14 in free-running mode against the radial friction force between the small, slotted gear 15' and its shaft because of that. The operating point of the small DC motor 11 and therefore its current consumption are merely shifted as a result because of the process of overcoming the friction force and this does not take place up to the blocking point of the small DC motor 11. This prevents a maximum amount of current from flowing through the motor brushes of the small DC motor 11 and causing a brush fire. The same thing takes place when the adjusting rod 18 moves up to the limit stop on the base of the lower housing part 4 in the opening process.

Using a different embodiment instead of the one involving the specifically described frictional retainer and/or putting the frictional retainer at a different suitable location of the reduction gearing falls under the ordinary ability of a person skilled in the art. The adjusting-nut element 17 can absolutely also be viewed as a shaft of the reduction gearing on which a slotted, driven gear (not shown) is mounted, for example.

Furthermore, small intermediate gear 15 could, as a variation, also be equipped with a frictional retainer acting in the axial direction by pressing it axially on its shaft against the large intermediate gear 14 by means of a frictional retainer spring 22'. The frictional retainer connection between the large intermediate gear 14 and the small intermediate gear 15 will only be stopped after the axial friction force is overcome.

Figure 5:
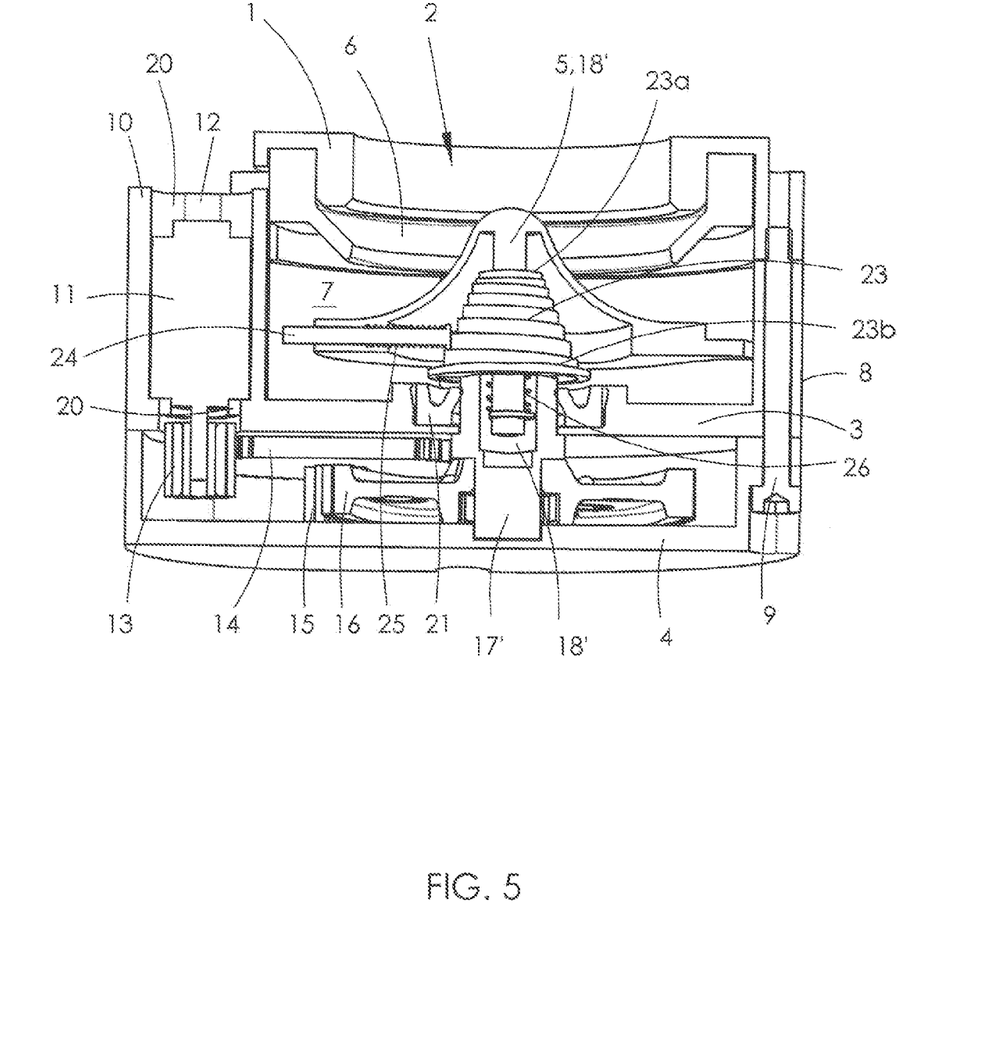
FIG. 5 is a sectional view through the valve in a third design variant.

FIG. 5 shows another embodiment of the invention. It is based on the use of a straight-wedge transmission for mechanical power limitation of the small DC motor 11. The streamlined valve disk 5 is connected to the adjusting rod 18' in a torsion-resistant way in the example. They can comprise a single plastic injection-molded part. But the valve disk 5 and the adjusting rod 18' can also be separate components. A plastic threaded wedge 23 conically tapered towards the top is seated on the adjusting rod 18' in the interior of the valve disk 5. In contrast to the previous embodiments, though, the adjusting rod 18' itself does not have an external thread and the adjusting-nut element 17' does not have an internal thread. The top part of the adjusting-nut element 17' is, however, connected to the mounted threaded wedge 23 in a torsion-resistant way, so it has an external thread in a certain sense. A spring-loaded, longitudinally displaceable carrier 24 is inserted crosswise to the adjusting rod 18' into the lower, flat portion of the valve disk 5, whose face operates against the thread turns of the threaded wedge 23. If the adjusting-nut element 17', driven by the reduction gearing, rotates when there is an open gas inlet 2 and power supplied to the small DC motor 11, the threaded wedge 23 also rotates with it. The torsion-locked unit made up of the adjusting rod 18' and the valve disk 5 screws upwards over the thread turns of the threaded wedge 23 because of that until the gas inlet 2 is sealed on the lip seal 6; the pressure spring 25 of the carrier 24 ensures that the carrier 24 is always in contact with the thread turns of the threaded wedge 23. The soft coil spring 26 between the lower end of the adjusting rod 18' and the threaded wedge 23 provides for reliable operation of the valve disk 5. In the closed end position of the valve, the carrier 24 operates on a flat surface 23a of the plastic threaded wedge 23 that is perpendicular to the adjusting rod 18; blocking of the small DC motor 11 cannot in turn come about because of that. The same takes place in the direction of the valve opening; the carrier 24 operates in the end on the flat surface 23b of the plastic threaded wedge 23 that is perpendicular to the adjusting rod 18.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. A gas shut-off valve for installation in gas meters, comprising: a valve disk that can be moved in a longitudinal direction with respect to a valve seat, said valve disk being seated on an adjusting rod held in the longitudinal direction in a valve casing, and a coupled linear unit that is actuated by an electric motor via reduction gearing, wherein, a) the valve seat has a lip seal,
b) the electric motor is a DC motor,
c) the reduction gearing is arranged laterally on the side of the linear unit, and
d) the linear unit configured to be a sliding screw gearing, comprising an adjusting-nut element and the adjusting rod integrated into a panel of the valve casing, wherein the external thread of the adjusting rod is disengaged from the internal thread of the adjusting-nut element at least in the closed position and/or in the open position of the valve.

2. The gas shut-off valve of claim 1, wherein the adjusting-nut element is actuated by the reduction gearing and is rotatably mounted in a lower housing part, and the adjusting rod is anti-rotationally placed in a longitudinally displaceable way.

3. The gas shut-off valve of claim 1, wherein the valve disk is configured to provide low resistance for gas flow entering from the gas inlet.

4. The gas shut-off valve of claim 1, wherein the reduction gearing is a multiple-reduction spur gearing.

5. The gas shut-off valve of claim 1, wherein the panel forms a separate housing chamber for the small DC motor and a lateral gas outlet opening.

6. The gas shut-off valve of claim 1, wherein the adjusting rod, actuated by the reduction gearing, is rotatably mounted in a lower housing part, and the adjusting-nut element is anti-rotationally placed in the area of the panel wherein the adjusting-nut element is mounted in a longitudinally displaceable way.

7. The gas shut-off valve of claim 1, wherein the reengagement of the external thread of the adjusting rod with the internal thread of the adjusting-nut element in the open position is realized by the pre-loaded pressure spring.

8. The gas shut-off valve of claim 1, wherein the reengagement of the external thread of the adjusting rod with the internal thread of the adjusting-nut element in the closed position is realized by the pre-loaded lip seal.

\* \* \* \* \*